(12) United States Patent
Xiang et al.

(10) Patent No.: US 10,198,312 B2
(45) Date of Patent: *Feb. 5, 2019

(54) SYNCHRONIZING REPLICAS WITH MEDIA ERRORS IN DISTRIBUTED STORAGE SYSTEMS

(71) Applicant: VMware, Inc., Palo Alto, CA (US)

(72) Inventors: Enning Xiang, San Jose, CA (US); Eric Knauft, San Francisco, CA (US); Pascal Renauld, Palo Alto, CA (US); Xin Li, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,293

(22) Filed: Apr. 2, 2018

(65) Prior Publication Data

US 2018/0225171 A1 Aug. 9, 2018

Related U.S. Application Data

(63) Continuation of application No. 15/199,128, filed on Jun. 30, 2016, now Pat. No. 9,952,923.

(51) Int. Cl.
*G06F 11/00* (2006.01)
*G06F 11/10* (2006.01)
*G06F 3/06* (2006.01)

(52) U.S. Cl.
CPC .......... *G06F 11/1004* (2013.01); *G06F 3/064* (2013.01); *G06F 3/0619* (2013.01); *G06F 3/0683* (2013.01)

(58) Field of Classification Search
CPC ...... G06F 11/1004; G06F 3/06; G06F 3/0619; G06F 3/064; G06F 3/0641; G06F 3/0683; G06F 3/0685; G06F 3/0686; G06F 3/0689
See application file for complete search history.

(56) References Cited

U.S. PATENT DOCUMENTS

| 9,020,895 | B1 * | 4/2015 | Rajashekar | ....... G06F 17/30088 |
| | | | | 707/639 |
| 9,251,002 | B2 * | 2/2016 | Manchek | ............ G06F 11/1407 |
| 9,588,844 | B2 * | 3/2017 | Bissett | ................ G06F 9/45533 |
| 9,652,338 | B2 * | 5/2017 | Bissett | ................ G06F 11/1484 |
| 2010/0325500 | A1 | 12/2010 | Bashir et al. | |
| 2011/0131466 | A1 | 6/2011 | Lamy-Bergo et al. | |
| 2015/0040226 | A1 | 2/2015 | Barau et al. | |
| 2017/0228417 | A1 | 8/2017 | Maccanti et al. | |

* cited by examiner

*Primary Examiner* — Christine T. Tu
(74) *Attorney, Agent, or Firm* — Fish & Richardson P.C.

(57) ABSTRACT

Systems and techniques are described for transferring data. A described technique includes receiving a request to transmit a data block from a first data storage device to a second data storage device. An attempt to read the data block from the first data storage device is made. A media error resulting from the attempt to read the data block from the first data storage device is detected. In response to detecting the media error, a new data block is generated and includes mismatched checksum data that causes a checksum mismatched error when the new data block is accessed. The new data block is transmitted for storage at the second data storage device in place of the data block.

20 Claims, 4 Drawing Sheets

SYNCHRONIZING REPLICAS WITH MEDIA ERRORS IN DISTRIBUTED STORAGE SYSTEMS

CROSS REFERENCE TO RELATED APPLICATIONS

This application is a continuation of U.S. Pat. No. 9,952,923, filed Jun. 30, 2016, which is incorporated herein by reference in its entirety.

BACKGROUND

This document relates to transferring data in distributed storage systems.

In distributed storage systems, it is a common routine to resynchronize data across replicas on different hosts. For example, data of a replica may be copied from a source host to a target host before maintenance is performed on the source host or before the disk format of the source host is upgraded. However, data of the replica may have an error, e.g., a disk media error, that can interrupt the data transfer process or lead to errors later when the data is to be read from the target host. For example, such disk media errors can prevent the data from being copied to another host or cause data corruption failures at the target host to which the data is copied.

BRIEF DESCRIPTION OF THE DRAWINGS

Like reference numbers and designations in the various drawings indicate like elements.

DETAILED DESCRIPTION

Figure 1:
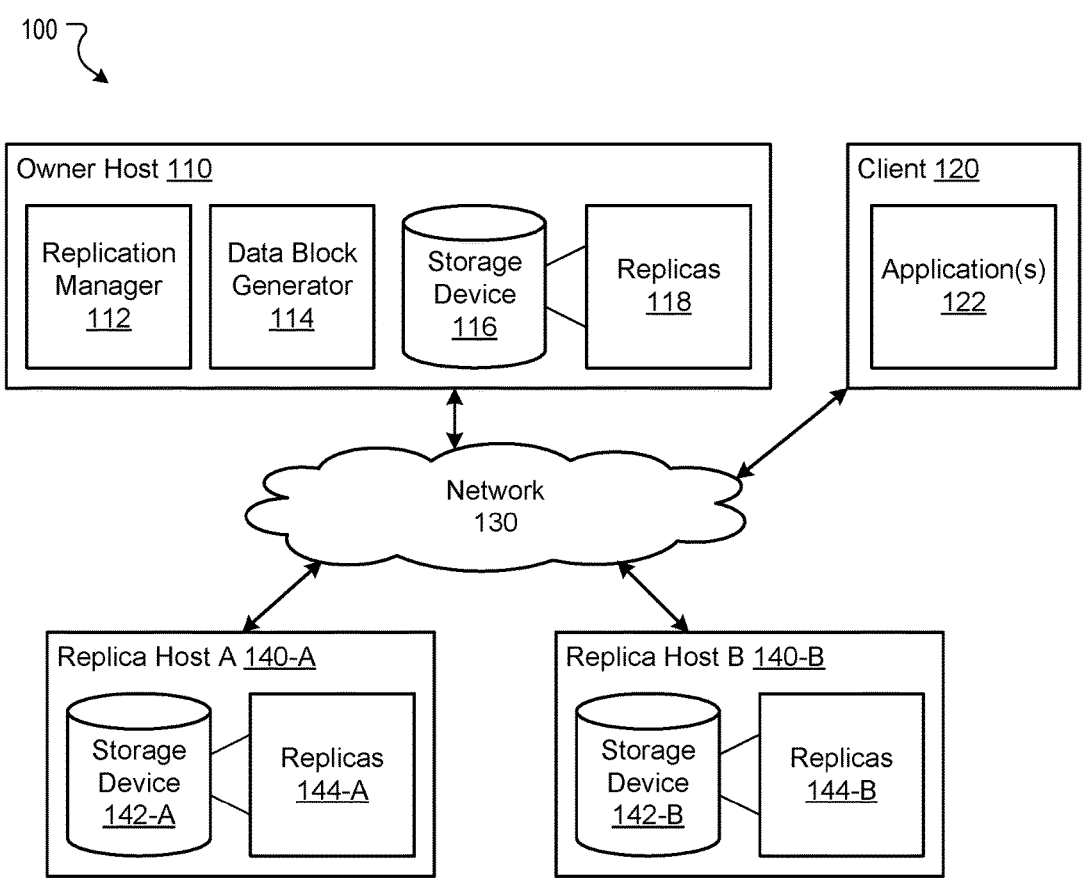
FIG. 1 shows an example environment in which data is transferred between data storage devices.

This document generally describes techniques for transferring data between data storage devices of distributed storage systems. In a distributed storage system, an object can be replicated on multiple hosts. For example, an owner host may manage the replication and synchronization of replicas of the object at multiple replica hosts. A replica of an object can include data and metadata for the object.

When a source replica host that stores a replica of an object is going to be unavailable, e.g., for maintenance or upgrades, the replica stored at the source host can be copied to another host referred to herein as a target host. For example, the replica may be transferred from the source host to a target host to provide host fault tolerance that complies with a policy requirement of the replicated object while the source host is unavailable. If data blocks of the replica that are stored at the source host have an error, e.g., a disk media error, the error can interrupt the process of copying the data of the replica or cause data corruption at the target host.

One approach to handle the detection of a data block that has an error is to simply ignore the error and continue copying data of the replica. However, undefined data might be read from the source host without any awareness and can potentially cause a silent data corruption failure at the target host. A silent data corruption failure is a data corruption failure that is undetected by the distributed storage system. Another approach to handle the error is to stop the data transfer between the hosts upon detection of the error for a data block. However, this approach will cause data replication failure, and is unacceptable in some business critical cases such as system upgrades.

A technique described herein can detect errors in data blocks of a replica and handle the errors in such a way that the process of copying data from the source host to the target host is not interrupted and silent data corruption failures are avoided at the target host. In some implementations, a new data block is created or obtained for data blocks that have been determined to have a media error or another appropriate type of error. The new data block can include mismatched checksum data and valid payload data. Although the payload data may be valid, the payload data may be incorrect as the correct payload data for the data block may not be available due to the media error.

The new data block can be transmitted to the target host in place of the data block that has an error. For example, the new data block may be transmitted to the target host without interrupting the sequence in which data is being copied from the source host to the target host. In this way, when an attempt is made to read data from the new data block (rather than the data block with the error) at the target host, the read will fail and a checksum mismatched error will be returned. This response is appropriate as the target host does not have correct payload data for the data block whose corresponding data block has the media error. After valid data is written to the new data block, e.g., during the normal operation of an application that uses the data block, the new data block can function normally by storing valid data and providing valid data in response to read requests.

Particular embodiments of the subject matter described in this document can be implemented so as to realize one or more of the following advantages. By identifying a data block that has an error during or before copying the data of from one host to another host and storing a data block with a checksum error in the identified data block's place, data can be copied and/or synchronized between hosts without error or with fewer errors. This allows the data transfer and/or synchronization process to complete uninterrupted and without causing data integrity problems at the host to which the data is copied. In addition, the transfer of undefined or corrupt data can be prevented, which in turn can prevent silent data corruption failures at the host to which the data is copied.

FIG. 1 shows an example environment 100 in which data is transferred between data storage devices. The example environment 100 includes an owner host 110, a client 120, and two replica hosts 140-A and 140-B. Other examples can include different numbers of owner hosts, clients, and replica hosts. The owner host 110, the client 120, and the replica hosts 140-A and 140-B can communicate data between each other over a network 130, e.g., a local area network (LAN), a wide area network (WAN), the Internet, a mobile network, or a combination thereof.

The owner host 110 is a computing host that manages the replication of a particular replicated object. For example, the owner host 110 may be a system of one or more computers that manages the replication of one or more replicated objects 118 stored in a data storage device 116. The replica hosts 140-A and 140-B can also store replicas 144-A and 144-B of the replicated objects in respective data storage devices 142-A and 142-B. In addition, the replica hosts 140-A and 140-B can be owner hosts for replicated objects for which they manage the replication.

The client 120 is a system of one or more computers that can host one or more applications 122. A replicated object 118 can store data for a respective application 122. While the application 122 is executed by the client 120, the application may request data from the object 118, e.g., by transmitting a read request to the owner host 110. In turn, the owner host 110 may access the data of the object 118 from the data storage device 116 and provide the requested data to the client 120. The application 122 may also write data to the object 118, e.g., by transmitting a write request to the owner host 110. The owner host 110 may then write the data to the data storage device 116. Although the client 120 is illustrated as a separate system of one or more computers, the client 120 can be part of the owner host 110 or one of the replica hosts 140-A or 140-B.

The example owner host 110 includes a replication manager 112, a data block generator 114, and the data storage device 116. The replication manager 112 can coordinate the replication and synchronization of the replicated objects between the data storage devices 116, 142-A, and 142-B. For example, the replication manager 112 can initiate and manage the copying of replicas from the data storage device 116 of the owner host 110 to the data storage devices 142-A and 142-B, from the data storage devices 142-A and 142-B to the data storage device 116, and between the data storage devices 142-A and 142-B.

As discussed above, the application 120 can read data from, and write data to, its respective replicated object(s) 118 stored by the owner host 110 for the object(s) 118. When the replicated object(s) 118 are modified, the replication manager 112 can synchronize the changes to the replicas of the replicated object stored in the data storage devices 142-A and/or 142-B of the replica hosts 140-A and 140-B. In another example, if the owner host 110 is unavailable, a new owner host may be elected for each replicated object 118 for which the owner host 110 manages replication. For example, a coordinator host for a distributed storage system that includes the owner host 110 and the replica hosts 140-A and 140-B may select one of the replica hosts 140-A or 140-B to be the owner host for the object(s) 118. While a replica host 140-A or 140-B is the owner host, the application(s) may read data from, and write data to, the replicas of the objects stored at the replica host 140-A or 140-B. When the owner host 110 becomes available again, the replication manager 112 can resynchronize the replicated objects 118 at the data storage device 116 by copying any data blocks that were modified while the owner host 110 was unavailable from the data storage device 142-A or 142-B of the replica host 140-A or 140-B to the data storage device 116.

The replication manager 112 can also copy data of a replicated object from a first host (e.g., a source host) to a second host (e.g., a target host) when the first host is expected to be unavailable. For example, the replica host 140-A may be scheduled for maintenance at a particular time. Prior to the particular time, the replication manager 112 may copy replicas 144-A stored in the data storage device 142-A of the replica host 140-A to a different host, e.g., the replica host 140-B. In this example, the replica host 140-B may not have previously stored the same replicas as the replica host 140-A. Instead, the replica host 140-B may be identified as a host for storing the replicas previously stored by the replica host 140-A, e.g., while the replica host 140-A is unavailable.

The replication manager 112 can manage the synchronization of replicas between hosts and/or the transfer of data between hosts in such a way that data blocks that have errors are handled without interrupting the data transfer process and without causing silent data corruption errors when data is later read from the data blocks. In some implementations, the replication manager 112 evaluates data blocks to identify data blocks that have an error, e.g., a disk media error. For example, the replication manager 112 may identify one or more ranges of data blocks that are to be transferred from a source host to a target host as part of the synchronization process for a replica. The replication manager 112 may read each range of data blocks (e.g., the payload and checksum data of the range of data blocks) to determine whether any of the ranges of data blocks have an error. For example, if a range of data blocks has an error, the replication manager may 112 may receive an error message in response to an attempt to read the range of data blocks rather than receiving data stored in the data blocks. For ranges of data blocks that do not have an error, the replication manager 112 may transfer the data blocks in the range of data blocks from the source host to the target host.

For each range of data blocks that do have an error, the replication manager 112 may read the payload and/or checksum data of smaller sized data blocks in the range of data blocks to identify the data block(s) that have an error. The replication manager 112 may transfer each data block that does not have an error from the source host to the target host. The data block generator 114 can create a new data block for each data block that has been identified as having an error. In some implementations, the data block generator 114 creates a new data block that has valid payload data and mismatched checksum data. For example, the new data block may include all-zero payload data. Although the payload data of the new data block may be valid, the payload data may be incorrect as the correct payload data for the data block may not be available due to the media error.

The checksum data are data of data blocks typically used to verify the authenticity or integrity of the payload data of the data block. The checksum data for a data block may be based on the payload data. For example, a checksum function may be used to generate checksum data for a data block based on the payload data of the data block. The checksum data output by the checksum function may vary significantly in response to minor changes to the payload data. In this way, if the payload data changes in transmission, the checksum data stored with the data block will not match the checksum data generated by applying the checksum function to the changed payload data. This causes a checksum mismatch, which causes a checksum mismatched error when a processor attempts to read data from the data block.

The mismatched checksum data of a new data block can be checksum data that is not based on the payload data of the new data block or a modified version of checksum data generated using the payload data of the new data block. For example, the data block generator 114 may generate a checksum that does not match the checksum that will be generated when the checksum function is applied to the payload data of the new data block. In this example, the data block generator 114 may generate a checksum for the new data block by applying the checksum function to the payload data (e.g., the all-zero payload data) and then modifying the checksum so that it does not match the generated checksum.

For each data block that has an error, the replication manager 112 can transfer a new data block to the target host and the target host can store the new data block in place of the data block that has the error. For example, the target host may store the new data block at the memory address at which the data block that has the error would have been stored.

If an application attempts to read data from the new data block stored at the target host, e.g., using an I/O read request, the mismatched checksum data will cause the request to fail and a checksum mismatched error will be returned. For example, the processor handling the read request may evaluate the checksum data of the new data block by applying the checksum function to the payload of the new data block. As the mismatched checksum data of the new data block will not match the checksum output by the checksum function, the checksum mismatched error will be returned. This response is appropriate as the target host would not have correct data for the data block if the data block having the error was copied to the target host.

During normal operation of an application that uses the replica that is being transferred from the source host to the target host, the payload data of each new data block may be overwritten with valid data. For example, the application may write to the data block as a result of performing some function of the application. When the payload data of the data block is overwritten, a new checksum may be determined for the data block based on the data written to the data block and the new checksum may be stored as checksum data with the data block. If the application later attempts to read data from the data block, the checksum data stored with the data block should match the checksum determined using the payload data and the checksum function.

Figure 3:
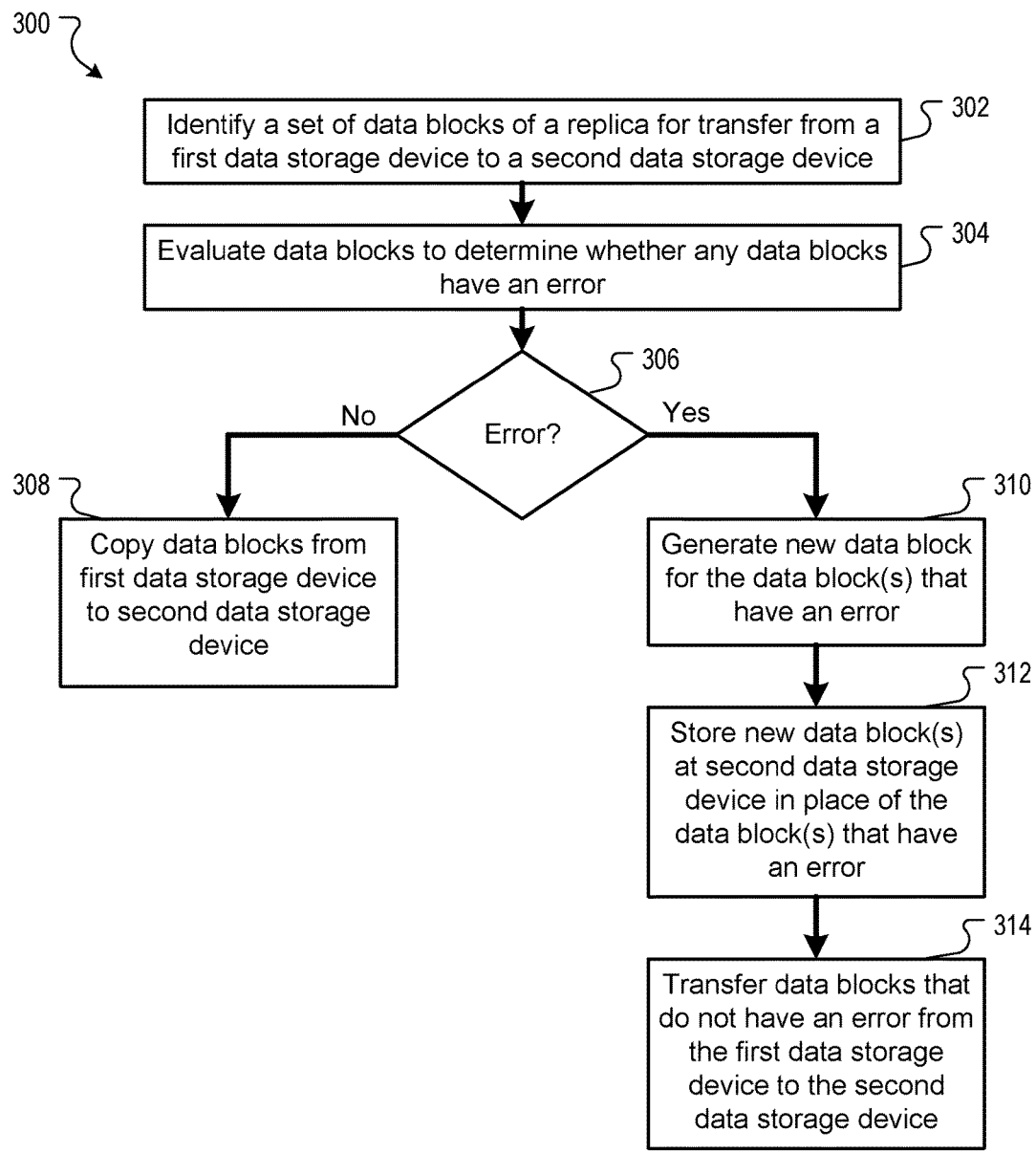
FIG. 3 is a flow chart of an example technique for transferring data between data storage devices.
Figure 4:
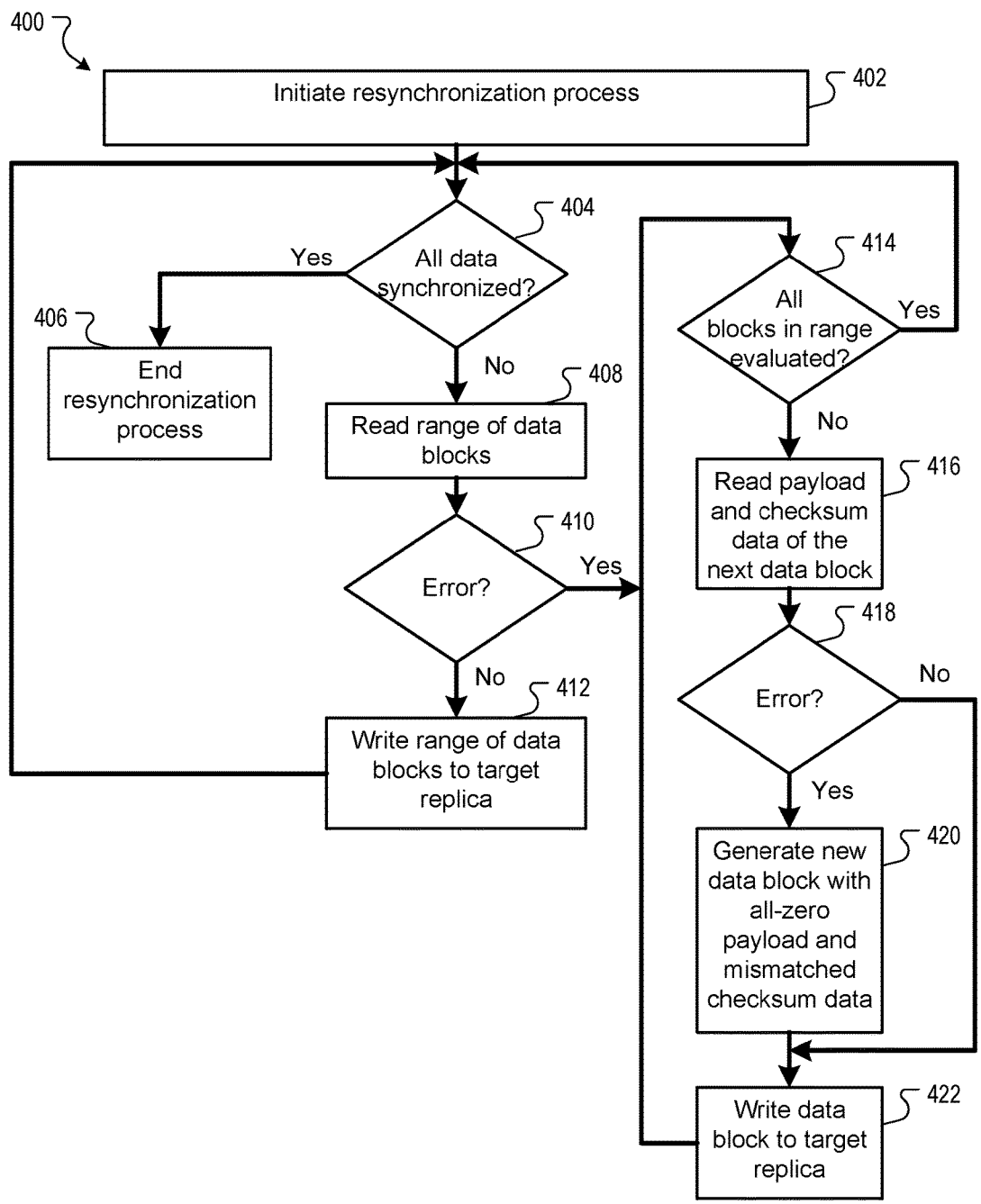
FIG. 4 is a flow chart of an example technique for transferring data between data storage devices.

By generating and copying new data blocks for data blocks that have an error, the replication manager 112 can complete the synchronization process without interruption and without transferring corrupt data to the target host. For example, a new data block can be generated and transferred to the target host for a data block that has an error at the time that the data block that has an error was to be transferred to the target host. Example techniques for transferring data between hosts are illustrated in FIGS. 2-4 and described below.

Figure 2:
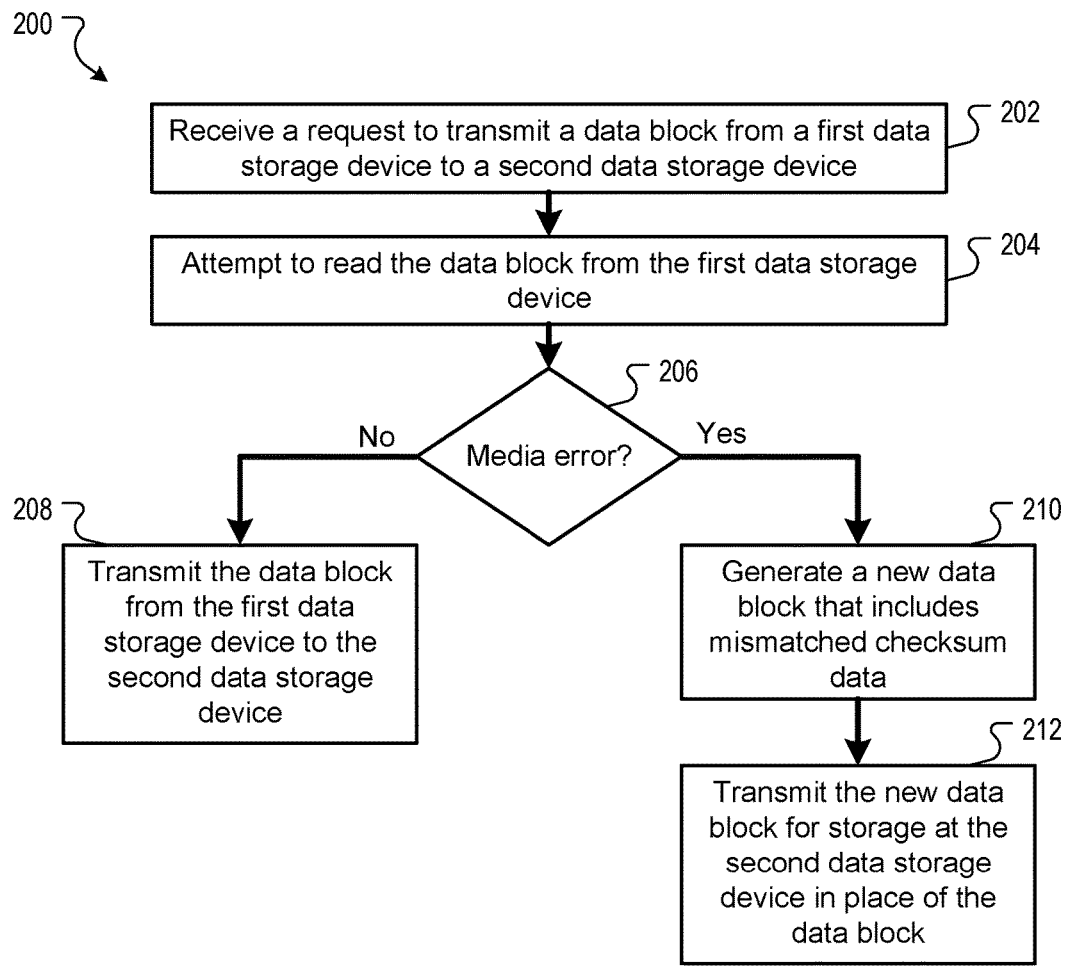
FIG. 2 is a flow chart of an example technique for transferring data between data storage devices.

FIG. 2 is a flow chart of an example technique 200 for transferring data between data storage devices. The example technique 200 is performed by a system of one or more computers. For example, the technique 200 may be performed by the owner host 110 of FIG. 1.

The system receives a request to transmit a data block from a first data storage device to a second data storage device (202). For example, the system may receive a request to copy a data block from a first data storage device to the second data storage device based on a planned unavailability of the first data storage device. The first data storage device may be part of a first host and the second data storage device may be part of a second host different from the first host.

The system attempts to read the data block from the first data storage device (204). For example, the system may transmit a read request to the first data storage device to read data from the data block.

The system determines whether the data block has a media error (206). For example, the system may detect a media error resulting from the attempt to read the data block from the first data storage device in response to receiving an error notification instead of the payload data of the data block. In another example, the system may detect a media error resulting from the attempt to read the data block from the first data storage device in response to a checksum for the payload of the data block not matching payload data stored with the data block. In this example, the system may apply a checksum function to the payload of the data storage device to determine the checksum for the payload data. If the determined checksum for the payload does not match the checksum data stored with the data block, the system may determine that the data block has an error.

If the system does not detect a media error resulting from the attempt to read the data block from the first data storage device, the system transmits the data block from the first data storage device to the second data storage device (208). For example, the system may copy the data block from the first data storage device to the appropriate memory address at the second data storage device.

If the system does detect a media error resulting from the attempt to read the data block from the first data storage device, the system generates a new data block that includes mismatched checksum data (210). As described above, the new data block can include valid payload data, e.g., all-zero payload data, and mismatched checksum data. The mismatched checksum data for a new data block may not match a checksum that is generated by applying a checksum function to the payload of the new data block. The payload data may not be the correct payload data for the data block as the media error may prevent the system from obtaining the correct payload data from the data block.

The system transmits the new data block for storage at the second data storage device in place of the data block (212). The new data block may be stored at the memory address of the second data storage device where the data block was to be stored.

FIG. 3 is a flow chart of an example technique 300 for transferring data between data storage devices. The example technique 300 is performed by a system of one or more computers. For example, the technique 300 may be performed by the owner host 110 of FIG. 1.

The system identifies a set of data blocks of a replica for transfer from a first data storage device to a second data storage device (302). For example, the first data storage device may be going offline or may be becoming unavailable due to maintenance or an upgrade. The set of data blocks may include all of the data blocks of the replica or data blocks that have been changed since a previous synchronization of the replica between the first and second data storage devices.

The system evaluates the data blocks in the set of data blocks to determine whether any data blocks have an error (304). For example, the system may attempt to read the payload data of each data block to determine whether the data block has an error. In another example, the system may attempt to read one or more ranges of data blocks to determine whether any range of data blocks have an error. For ranges of data blocks that have an error, the system may attempt to read the payload data of each individual data block in the range to identify data blocks that have an error. The system can detect an error for a range of data blocks or for an individual data block based on the response received when attempting to read the data. If a range of data blocks or an individual data block has an error, the attempted read may fail and the system may receive an error message rather than the data stored in the range of data blocks or the data stored in the individual data block.

In another example, the system may determine whether a data block has an error by comparing the checksum data stored with the data block to a checksum of the payload data. In this example, the system may apply a checksum function to the payload to determine the checksum for the payload data. If the determined checksum for the payload does not match the checksum data stored with the data block, the system may determine that the data block has an error.

The system determines whether any of the data blocks have an error based on the evaluating (306). If no data block has an error, the system may copy each data block in the set of data blocks from the first data storage device to the second data storage device (308).

If the system determines that one or more data blocks that have an error, the system generates a respective new data block for each data block that has an error (310). As described above, the new data blocks can include valid payload data, e.g., all-zero payload data, and mismatched checksum data. The mismatched checksum data for a new data block may not match a checksum that is generated by applying a checksum function to the payload of the new data block. The payload data may not be the correct payload data for the data block as the error may prevent the system from obtaining the correct payload data from the data block.

The system stores the new data block for each data block that has an error in place of the data block that has an error at the second data storage device (312). For example, the new data block for a particular data block that has an error may be stored at the memory address where the particular data block would have been stored if the particular data block did not have an error. The data block that has the error may not be transferred from the first data storage device to the second data storage device.

In some implementations, the system may transfer the new data block from the first data storage device to the second data storage device. In another example, the computer(s) that generate the new data block may be different from the hosts that include the first and second data storage devices. In this example, the system may obtain the new data block from the computer(s) and transfer the new data block to the second data storage device. The mismatched checksum data for the new data block may be transferred to the second data storage device with the new data block and stored with the new data block at the second data storage device.

The system transfers data blocks that do not have an error from the first data storage device to the second data storage device (314). For example, only a portion of the data blocks in the set of data blocks may have an error. For data blocks that do not have an error, the system may copy the data blocks from the first data storage device to the second data storage device and store the data blocks at their appropriate memory addresses at the second data storage device.

Although the example, technique 300 is illustrated as generating new data blocks for data blocks that have an error prior to transferring data blocks that do not have an error, these operations can be done in reverse order, in parallel, or based on a sequence in which the data blocks are to be transferred. For example, each individual data block may be transferred in a particular sequence. When it is time for that data block to be transferred, or when it is time for a range of data blocks that include the data back to be transferred, the system may determine whether the data block has an error. If so, the system may generate a new data block and store the new data block at the second data storage device in place of the data block that has an error. If not, the system may transfer the data block from the first data storage device to the second data storage device. After the data block or its new data block is transferred, the system may move to the next data block or range of data blocks in the sequence.

After the set of data blocks are transferred, an application may access the data blocks, e.g., during normal operation of the application. For example, after synchronization, the application may attempt to read data from the data blocks of the second data storage device rather than the first data storage device. If the data block is a new data block with mismatched checksum data that has not been overwritten by the application, an attempted read of the data block will result in a checksum mismatched error. For example, the system may receive a request to read data from the new data block stored at the second data storage device. The system may determine a checksum for the new data block by applying a checksum function to the payload data of the new data block and comparing the determined checksum to the checksum data of the new data block. As the mismatched checksum data of the new data block will not match the checksum, the system will generate a checksum mismatched error in response to the read request.

The application may also attempt to write data to the data blocks of the second data storage device. For example, the system may receive, from the application, a request to write data to a new data block. The system may overwrite the payload data of the new data block with the data of the received request. The system may also determine a new checksum for the new data block based on the payload data that has been written to the new data block and the checksum function. The system may replace the mismatched checksum data of the new data block with the determined checksum. In this way, if the application attempts to read the payload data from the new data block, the read request will be successful and will not result in a checksum mismatched error. The system can read the payload data from the new data block and provide the data in response to the read request.

FIG. 4 is a flow chart of an example technique 400 for transferring data between data storage devices. The example technique 400 is performed by a system of one or more computers. For example, the technique 400 may be performed by the owner host 110 of FIG. 1.

The system initiates a resynchronization process (402). For example, a source host may be going offline and a replica stored at the source host may be synchronized with a target host that will host the replica while the source host is offline. In another example, the target host may be coming back online and the replica may be synchronized at the target host using the replica stored at the source host.

The system determines whether all data of the replica has been synchronized (404). During resynchronization, the system may copy all data blocks of the replica from the source host to the target host or just data blocks that have been modified since a previous resynchronization. The system can identify the data blocks that are to be copied. After some of the data blocks are copied to the target host, the system can determine whether any additional data blocks still need to be copied to the target host. If so, all data of the replica has not yet been synchronized.

If the system determines that all of the data of the replica has been synchronized, the system can end the resynchronization process (406). The system may also cause an application that uses the synchronized replica to read data from, and write data to, the target host at which the replica was synchronized.

If the system determines that at least some data has not been synchronized at the target host, the system can attempt to read a range of data blocks that are to be copied to the target host (408). If any data blocks in the range have an error, the attempted read may fail or result in an error.

The system determines whether the attempted read failed or resulted in an error (410). For example, the system may receive payload data of the data blocks if the read was successful. If the read failed, the system may receive an error message. If the attempted read did not fail or result in an error, the system copies the data blocks in the range of data blocks to the target host (412). After copying the data blocks in the range of data blocks to the target host, the system can return to operation 404 to determine whether all data of the replica has been synchronized with the target host.

If the attempted read did fail or result in an error, the system can determine whether each individual data block in the range of data blocks has been evaluated (414). For example, the system may evaluate each individual data block in the range of data blocks for an error. The system may evaluate the data blocks in a particular sequence, e.g., based on their memory addresses. If the system determines that all of the individual data blocks have been evaluated, the system returns to operation 304 to determine whether all data has been synchronized.

If the system determines that one or more of the individual data blocks have not been evaluated, the system evaluates the next data block in the range of data blocks (416). To evaluate a data block, the system may attempt to read the payload data and checksum data of the data block. If there is an error, the system may receive an error message rather than the payload data or checksum data. For example, the system may receive a disk media error in response to the attempted read. If the data block does not have an error, the system may receive the payload data and the checksum data.

If the system determines that the data block has an error, the system generates or obtains a new data block for the data block (420). The new data block may include mismatched checksum data and valid payload. For example, the mismatched checksum data for a new data block may not match a checksum that is generated by applying a checksum function to the payload of the new data block. The payload of the new data block may be all-zero payload data.

The system writes a data block for the evaluated data block to the target host (422). If the evaluated data block had an error, the system can write the new data block to the target host in place of the evaluated data block. If the evaluated data block does not have an error, the system can write the evaluated data block to the target host.

After writing a data block for the evaluated data block to the target host, the system returns to operation 414 to determine whether all of the data blocks in the range have been evaluated. The system can continue performing the operations 404-422 until all ranges of data blocks have been read and data for each range of data blocks has been synchronized at the target host and/or new data blocks have been stored at the target host for any data blocks that have an error.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving a request to copy a replica of an object from a first host to a second host, wherein the first host stores data of the replica of the object in a set of data blocks;
    for each of a plurality of subsets of the set of data blocks, determining whether the subset of data blocks has a media error by attempting to read the subset of data blocks;
    for each subset of data blocks that does not have a media error, copying the subset of data blocks from the first host to the second host;
    for each subset of data blocks that has a media error:
        identifying, in the subset of data blocks, each data block that has a media error;
        generating, for each identified data block, a new data block including mismatched checksum data that causes a checksum mismatched error when the new data block is accessed; and
        copying, to the second host, (i) each data block of the subset of data blocks that does not have a media error and (ii) the new data block generated for each identified data block.

2. The method of claim 1, wherein identifying, in the subset of data blocks, each data block that has a media error comprises attempting to read each data block in the subset of data blocks.

3. The method of claim 1, wherein determining whether the subset of data blocks has a media error by attempting to read the subset of data blocks comprises:
    attempting to read at least one of payload data or checksum data of the subset of data blocks;
    receiving an error message in response to attempting to read the at least one of payload data or checksum data of the subset of data blocks; and
    in response to receiving the error message, determining that the subset of data blocks has a media error.

4. The method of claim 1, wherein each new data block includes all-zero payload data.

5. The method of claim 1, further comprising:
receiving a request to access payload data from a particular new data block stored at the second host;
generating checksum data for the particular new data block by applying a checksum function to the payload data of the particular new data block stored at the second host;
determining that mismatched checksum data of the particular new data block stored at the second host does not match the generated checksum data; and
generating a checksum mismatched error in response to determining that mismatched checksum data of the particular new data block stored at the second host does not match the generated checksum data.

6. The method of claim 1, further comprising:
receiving a request to write data to a particular new data block stored at the second host;
overwriting payload data of the particular new data block at the second host with the data of the received request;
receiving, subsequent to the request to write data to the particular new data block, a request to read data from the particular new data block at the second host; and
providing the payload data of the particular new data block in response to the request to read data from the particular new data block.

7. The method of claim 1, wherein copying the new data block in place of each data block that has a media error block prevents interruption of copying the replica of the object from the first host to the second host.

8. A system comprising:
a data processing apparatus; and
a memory apparatus in data communication with the data processing apparatus and storing instructions executable by the data processing apparatus and that upon such execution cause the data processing apparatus to perform operations comprising:
receiving a request to copy a replica of an object from a first host to a second host, wherein the first host stores data of the replica of the object in a set of data blocks;
for each of a plurality of subsets of the set of data blocks, determining whether the subset of data blocks has a media error by attempting to read the subset of data blocks;
for each subset of data blocks that does not have a media error, copying the subset of data blocks from the first host to the second host;
for each subset of data blocks that has a media error:
identifying, in the subset of data blocks, each data block that has a media error;
generating, for each identified data block, a new data block including mismatched checksum data that causes a checksum mismatched error when the new data block is accessed; and
copying, to the second host, (i) each data block of the subset of data blocks that does not have a media error and (ii) the new data block generated for each identified data block.

9. The system of claim 8, wherein identifying, in the subset of data blocks, each data block that has a media error comprises attempting to read each data block in the subset of data blocks.

10. The system of claim 8, wherein determining whether the subset of data blocks has a media error by attempting to read the subset of data blocks comprises:
attempting to read at least one of payload data or checksum data of the subset of data blocks;
receiving an error message in response to attempting to read the at least one of payload data or checksum data of the subset of data blocks; and
in response to receiving the error message, determining that the subset of data blocks has a media error.

11. The system of claim 8, wherein each new data block includes all-zero payload data.

12. The system of claim 8, wherein the operations comprise:
receiving a request to access payload data from a particular new data block stored at the second host;
generating checksum data for the particular new data block by applying a checksum function to the payload data of the particular new data block stored at the second host;
determining that mismatched checksum data of the particular new data block stored at the second host does not match the generated checksum data; and
generating a checksum mismatched error in response to determining that mismatched checksum data of the particular new data block stored at the second host does not match the generated checksum data.

13. The system of claim 8, wherein the operations comprise:
receiving a request to write data to a particular new data block stored at the second host;
overwriting payload data of the particular new data block at the second host with the data of the received request;
receiving, subsequent to the request to write data to the particular new data block, a request to read data from the particular new data block at the second host; and
providing the payload data of the particular new data block in response to the request to read data from the particular new data block.

14. The system of claim 8, wherein copying the new data block in place of each data block that has a media error block prevents interruption of copying the replica of the object from the first host to the second host.

15. A non-transitory computer storage medium encoded with a computer program, the program comprising instructions that when executed by data processing apparatus cause the data processing apparatus to perform operations comprising:
receiving a request to copy a replica of an object from a first host to a second host, wherein the first host stores data of the replica of the object in a set of data blocks;
for each of a plurality of subsets of the set of data blocks, determining whether the subset of data blocks has a media error by attempting to read the subset of data blocks;
for each subset of data blocks that does not have a media error, copying the subset of data blocks from the first host to the second host;
for each subset of data blocks that has a media error:
identifying, in the subset of data blocks, each data block that has a media error;
generating, for each identified data block, a new data block including mismatched checksum data that causes a checksum mismatched error when the new data block is accessed; and
copying, to the second host, (i) each data block of the subset of data blocks that does not have a media error and (ii) the new data block generated for each identified data block.

16. The non-transitory computer storage medium of claim 15, wherein identifying, in the subset of data blocks, each data block that has a media error comprises attempting to read each data block in the subset of data blocks.

17. The non-transitory computer storage medium of claim 15, wherein determining whether the subset of data blocks has a media error by attempting to read the subset of data blocks comprises:
   attempting to read at least one of payload data or checksum data of the subset of data blocks;
   receiving an error message in response to attempting to read the at least one of payload data or checksum data of the subset of data blocks; and
   in response to receiving the error message, determining that the subset of data blocks has a media error.

18. The non-transitory computer storage medium of claim 15, wherein each new data block includes all-zero payload data.

19. The non-transitory computer storage medium of claim 15, wherein the operations comprise:
   receiving a request to access payload data from a particular new data block stored at the second host;
   generating checksum data for the particular new data block by applying a checksum function to the payload data of the particular new data block stored at the second host;
   determining that mismatched checksum data of the particular new data block stored at the second host does not match the generated checksum data; and
   generating a checksum mismatched error in response to determining that mismatched checksum data of the particular new data block stored at the second host does not match the generated checksum data.

20. The non-transitory computer storage medium of claim 15, wherein the operations comprise:
   receiving a request to write data to a particular new data block stored at the second host;
   overwriting payload data of the particular new data block at the second host with the data of the received request;
   receiving, subsequent to the request to write data to the particular new data block, a request to read data from the particular new data block at the second host; and
   providing the payload data of the particular new data block in response to the request to read data from the particular new data block.

\* \* \* \* \*